(12) United States Patent
Jayasekara et al.

(10) Patent No.: US 7,295,401 B2
(45) Date of Patent: Nov. 13, 2007

(54) LAMINATED SIDE SHIELD FOR PERPENDICULAR WRITE HEAD FOR IMPROVED PERFORMANCE

(75) Inventors: Wipul Pemsiri Jayasekara, Los Gatos, CA (US); Hardayal Singh Gill, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 298 days.

(21) Appl. No.: 10/975,283

(22) Filed: Oct. 27, 2004

(65) Prior Publication Data

US 2006/0098334 A1 May 11, 2006

(51) Int. Cl.
*G11B 5/11* (2006.01)
*G11B 5/147* (2006.01)

(52) U.S. Cl. .................................... 360/126
(58) Field of Classification Search .............. 360/126, 360/125
See application file for complete search history.

(56) References Cited

U.S. PATENT DOCUMENTS

| | | | |
|---|---|---|---|
| 4,740,855 A | 4/1988 | Diepers et al. ............. | 360/126 |
| 4,873,599 A | 10/1989 | Sueoka ....................... | 360/126 |
| 4,935,832 A | 6/1990 | Das et al. ................... | 360/112 |
| 5,032,945 A | 7/1991 | Argyle et al. ............... | 360/126 |
| 5,075,956 A | 12/1991 | Das .......................... | 29/603.14 |
| 5,108,837 A | 4/1992 | Mallary ....................... | 428/336 |
| 5,111,352 A | 5/1992 | Das et al. ................... | 360/321 |
| RE33,949 E | 6/1992 | Mallary et al. | |
| 6,259,583 B1 * | 7/2001 | Fontana et al. ............. | 360/126 |
| 2004/0212923 A1 * | 10/2004 | Taguchi ..................... | 360/125 |
| 2005/0068678 A1 * | 3/2005 | Hsu et al. ................... | 360/126 |

FOREIGN PATENT DOCUMENTS

| | | |
|---|---|---|
| EP | 0 146 003 | 6/1985 |
| JP | 60-57515 | 4/1985 |
| JP | 6-162442 | 6/1994 |
| JP | 7-135111 | 5/1995 |

OTHER PUBLICATIONS

D.A. Herman and B.E. Argyle, Edge-Closed Laminated Structures for This-Film Heads. J. App. Phys. 69(8), Apr. 15, 1991.

Yasushi Kanai, Ryo Matsubara, Hideaki Watanabe, Hiroaki Muraoka, Yoshihisa Nakamura, Recording Field Analysis of Narrow-Track SPT Head With Side Shields, Tapered Main Pole, and Tapered Return Path for 1 Tb/in2, IEEE Transactions On Magnetis, vol. 39, No. 4, Jul. 2003.

Yasushi Kanai, Osama H. Mohammed, Ryo Matsubara, Hiroaki Muraoka, Yoshisha Nakamura, Numerical analysis of narrow-track single-pole-type head with side shields for 1 Tb/in.2, Journal Of Applied Physics, vol. 93, No. 10, May 15, 2003, American Institute of Physics.

(Continued)

*Primary Examiner*—Julie Anne Watko
(74) *Attorney, Agent, or Firm*—Law Offices of Imam

(57) ABSTRACT

A perpendicular write head is disclosed for writing information onto tracks. The write head includes a top pole and a return pole and side shields with laminated layers wherein said laminated layers have magnetization in a direction parallel to an air bearing surface (ABS) and perpendicular to the tracks.

59 Claims, 13 Drawing Sheets

OTHER PUBLICATIONS

M. Mallary, A. Torabi, M. Benakli, One Terabit per Square Inch Perpendicular Recording Conceptual Design, IEEE Transactions On Magnetics, vol. 38, No. 4, Jul. 2002.

Jeffery McCord, John Westwood, Domain Optimization of Sputtered Permalloy Shields for Recording Heads, IEEE Transactions On Magnetics, vol. 37, No. 4, Jul. 2001.

Kiyoshi Yamakawa, Kaori Taguchi, Naoki Honda, Kazuhiro Ouchi, Shun-Ichi Iwasaki, Writing performance of narrow trackwidth single pole perpendicular heads, Journal of Applied Physics, vol. 87, No. 9, May 1, 2000, American Institute of Physics.

\* cited by examiner

Non-laminated side return pole

LAMINATED SIDE SHIELD FOR PERPENDICULAR WRITE HEAD FOR IMPROVED PERFORMANCE

BACKGROUND OF THE INVENTION

1. Field of the Invention

This invention relates generally to the field of perpendicular magnetic recording or write heads and more particularly, to write heads having laminated side shields with increased permeability for improved performance.

2. Description of the Prior Art

As the recording density of magnetic hard drives (or disk drives) increases, a physical limitation is experienced using longitudinal recording systems partly due to thermal relaxation known as super-paramagnetism. That is, the density requirements for meeting today's storage needs are simply not attainable with longitudinal recording systems. To provide further insight into this problem, it is anticipated that longitudinal recording systems will lose popularity as storage capacities in excess of about 150 Gigabytes-per-square-inches become a requirement. These and other factors have lead to the development and expected launch of perpendicular recording heads or write heads. Perpendicular recording is promising in pushing the recording density beyond the limit of longitudinal recording.

Accordingly, perpendicular recording potentially can support much higher linear density than longitudinal recording due to lower demagnetizing fields in recorded bits, which diminish when linear density increases.

A magnetic recording head for perpendicular writing generally includes two portions, a write head portion or head for writing or programming magnetically-encoded information on a magnetic media or disk and a reader portion for reading or retrieving the stored information from the media.

The write head or recording head of the magnetic head or disk drive for perpendicular recording typically includes a main pole and a return pole which are magnetically separated from each other at an air bearing surface (ABS) of the writer by a nonmagnetic gap layer, and which are magnetically connected to each other at a region distal from the ABS at a back gap closure (yoke). This structure is referred to as a single-pole write head because while a main pole and return pole are referred thereto, the return pole is not physically a pole, rather, it serves to close the loop with the main pole and the soft under layer for magnetic flux circuit.

Positioned at least partially between the main and return poles are one or more layers of conductive coils encapsulated by insulation layers. The ABS is the surface of the magnetic head immediately adjacent to the recording medium.

To write data to the magnetic medium, an electrical current is caused to flow through the conductive coil, thereby inducing a magnetic field through the write head yoke, fringing across the write head gap at the media. By reversing the polarity of the current through the coil, the polarity of the data written to the magnetic media is also reversed.

The main and return poles are generally made of a soft magnetic material. Both of them generate magnetic field in the media during recording when the write current is applied to the coil.

In perpendicular recording heads, writing and erasing of information is performed by a single-pole write head. That is, the return pole is, in essence, a misnomer because it does not actually serve as a pole. The single-pole or the main pole is composed of high moment magnetic materials, the most common example being cobalt-iron (CoFe) alloys.

FIG. 1 shows a portion of a prior art return pole 10 included within a perpendicular write head and at 12, there is shown a coil wrapped around the yoke to generate magnetic flux upon the presence of an appropriate level of current to the write head. And upon the occurrence of the latter, programming or writing occurs on the medium 16 where as each of the bit locations of the medium 16 experience electromagnetic field at the tip 14, a bit is programmed. Bit locations 18 and 20 are programmed in opposite polarity to each other. The goal is to program each bit location without any adverse affects on adjacent bit locations. For example, ideally, when the bit location 18 is being programmed, no flux is influencing adjacent bit locations thereto, such as the bit location 20. In prior art systems, one of the problems is undesirable programming or affect of adjacent bit locations during the programming of a given bit location.

Thus, the need arises to reduce the field affecting adjacent bits by increasing the permeability of the regions of the shields that surround the main pole. In other words, it is desirable to reduce Adjacent Track Interference (ATI).

FIG. 2 shows a top view of a characteristic domain structure of a piece of magnetic material used in a perpendicular write head. The domains 26-32 are shown as arrows in a manner forming a closed magnetic circuit as materials having magnetic characteristics tend to do. The domain structure is excited or energized at 24. The magnetization of the domains that are shown to be perpendicular to the direction of the energizing (the direction of the magnetic field) at 24 are typically easier to rotate and thus conduct magnetic flux than the domains that are shown to be in parallel to the direction of energizing at 24. Thus, if the magnetization of the domains is perpendicular to the direction of flux, the material is more permeable than when the domains are parallel to the direction of flux.

FIG. 3 shows an ABS view of a portion of a prior art write head having a trailing shield 34, side shields 40, a top pole 36 and a bottom return pole 38. At this point, it should be noted that while not shown, the main pole is generally shaped in a manner causing a tip or an extension thereof that is narrower than the remaining portion thereof to form a top pole, such as the top pole 36. The side shields 40 act to shield the top pole so as to reduce adverse affects on adjacent tracks during the writing of magnetic transitions (data) at a location on a given track. FIG. 4 shows a top down view of the domain structures associated with the side shield 40 of FIG. 3. When energized at 42, the problem becomes the difficulty associated with moving the domains that are in a direction parallel to the direction of the flux or energizing.

Thus, the need arises for a write head to include a side shield that is laminated to form a flux closure in the direction of its cross section and having higher permeability thereby reducing over writing of adjacent tracks of a disk and increasing performance.

SUMMARY OF THE INVENTION

Briefly, a perpendicular write head is disclosed for writing information onto tracks. The write head includes a top pole and a return pole, and side shields with laminated layers wherein said laminated layers have magnetization in a direction parallel to an air bearing surface (ABS) and perpendicular to the tracks.

IN THE DRAWINGS

Figure 1:
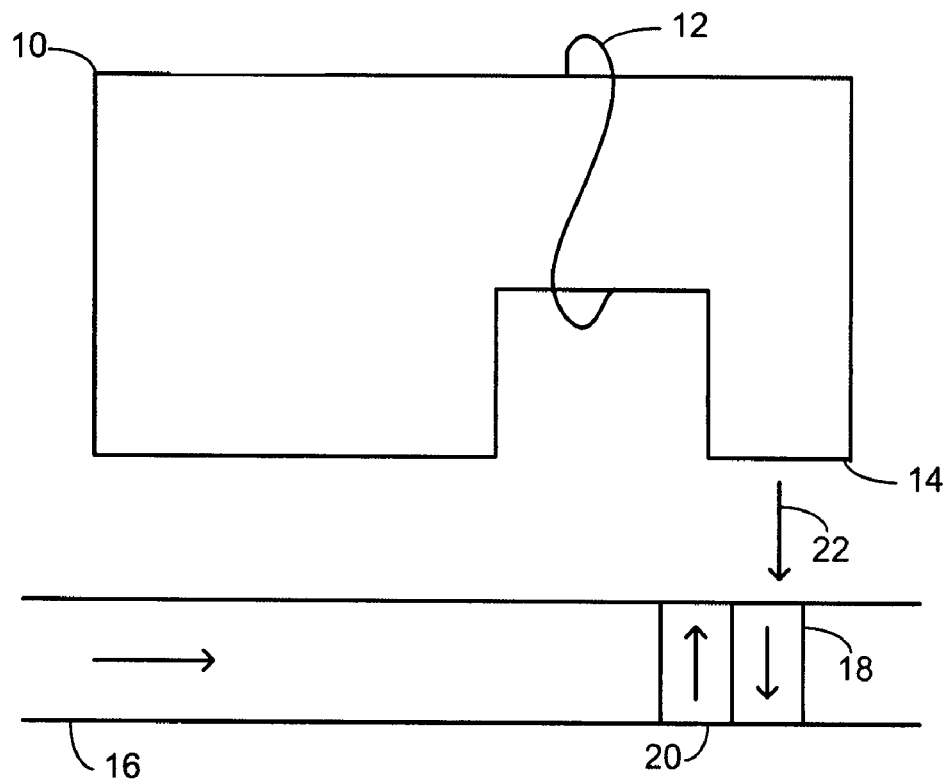
FIG. 1 shows a portion of a prior art return pole 10 included within a perpendicular write head.
Figure 2:
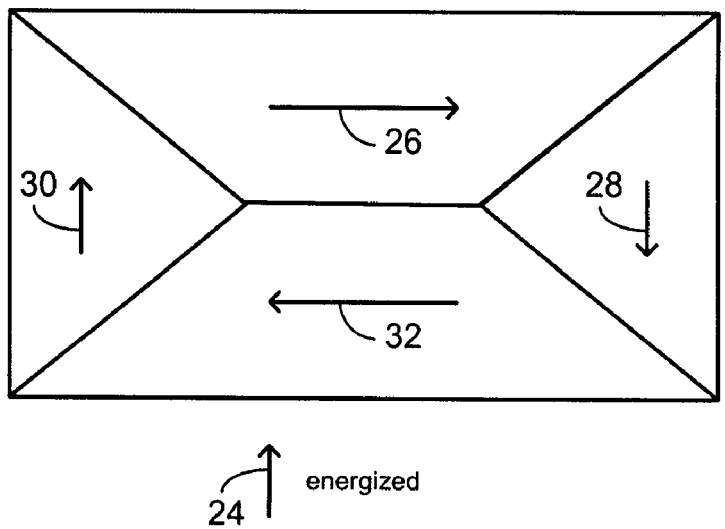
FIG. 2 shows a top view of the characteristic domain structure of a piece of magnetic material typically used in a perpendicular write head.
Figure 3:
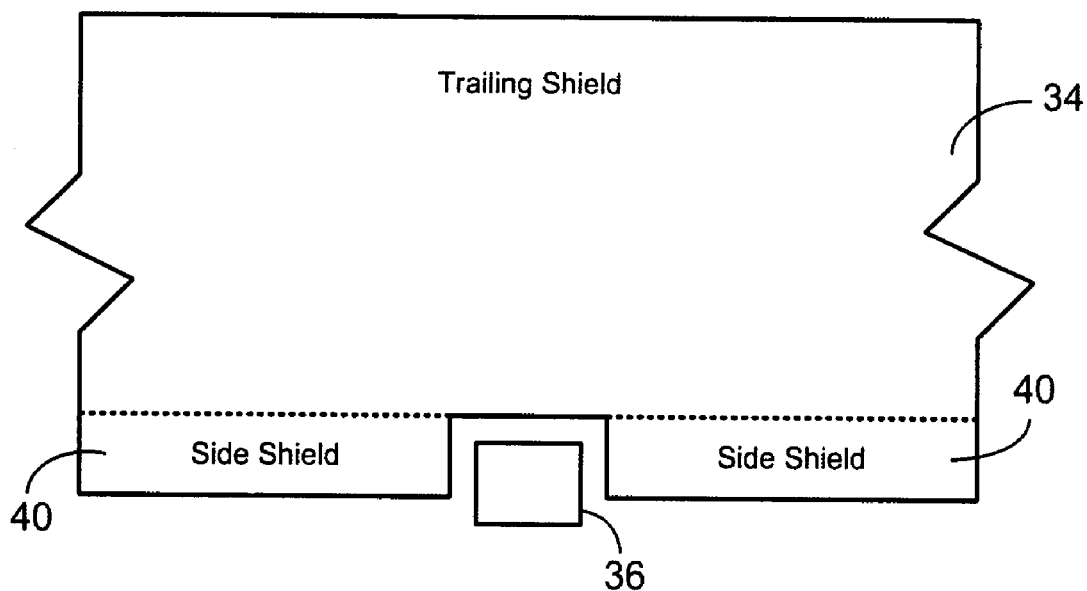
Figure 3:
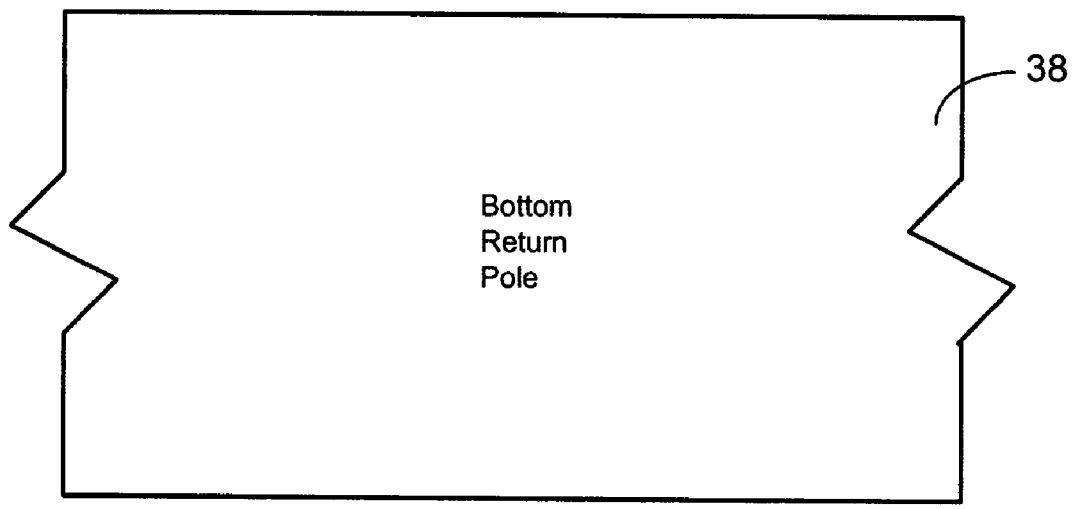

FIG. 3 illustrates an ABS view of a portion of a prior art write head having a trailing shield 34, side shields 40, a top pole 36 and a bottom return pole 38.

Figure 4:
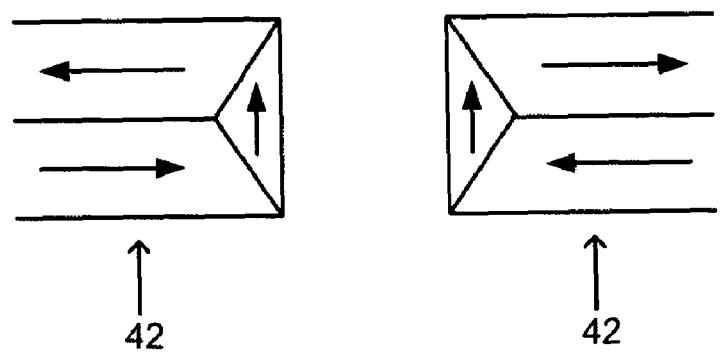

FIG. 4 shows a top down view of the domain structures associated with the side shield 40 of FIG. 3.

Figure 5:
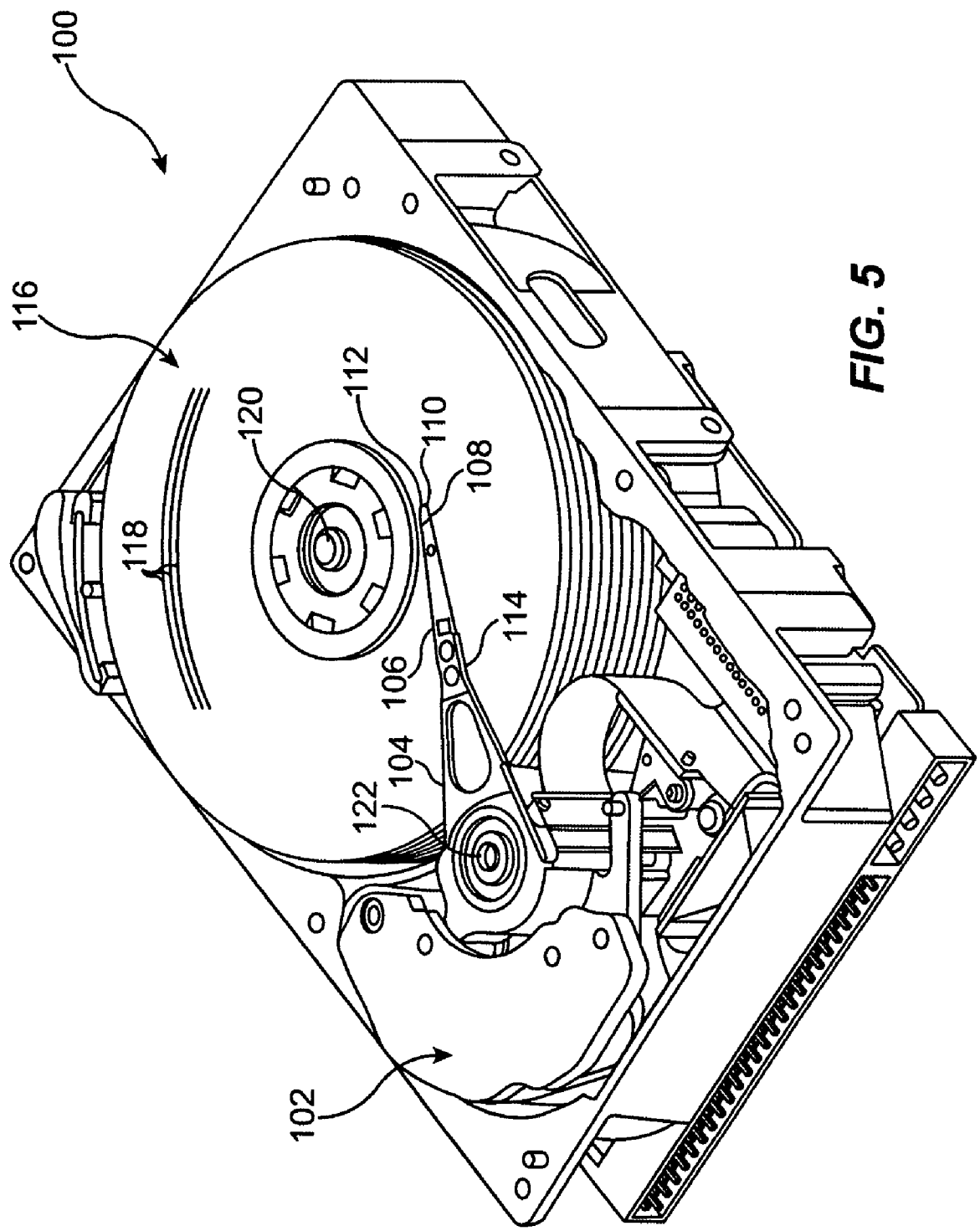

FIG. 5 shows a top perspective view of a disk drive 100 is shown in accordance with an embodiment of the present invention.

Figure 6:
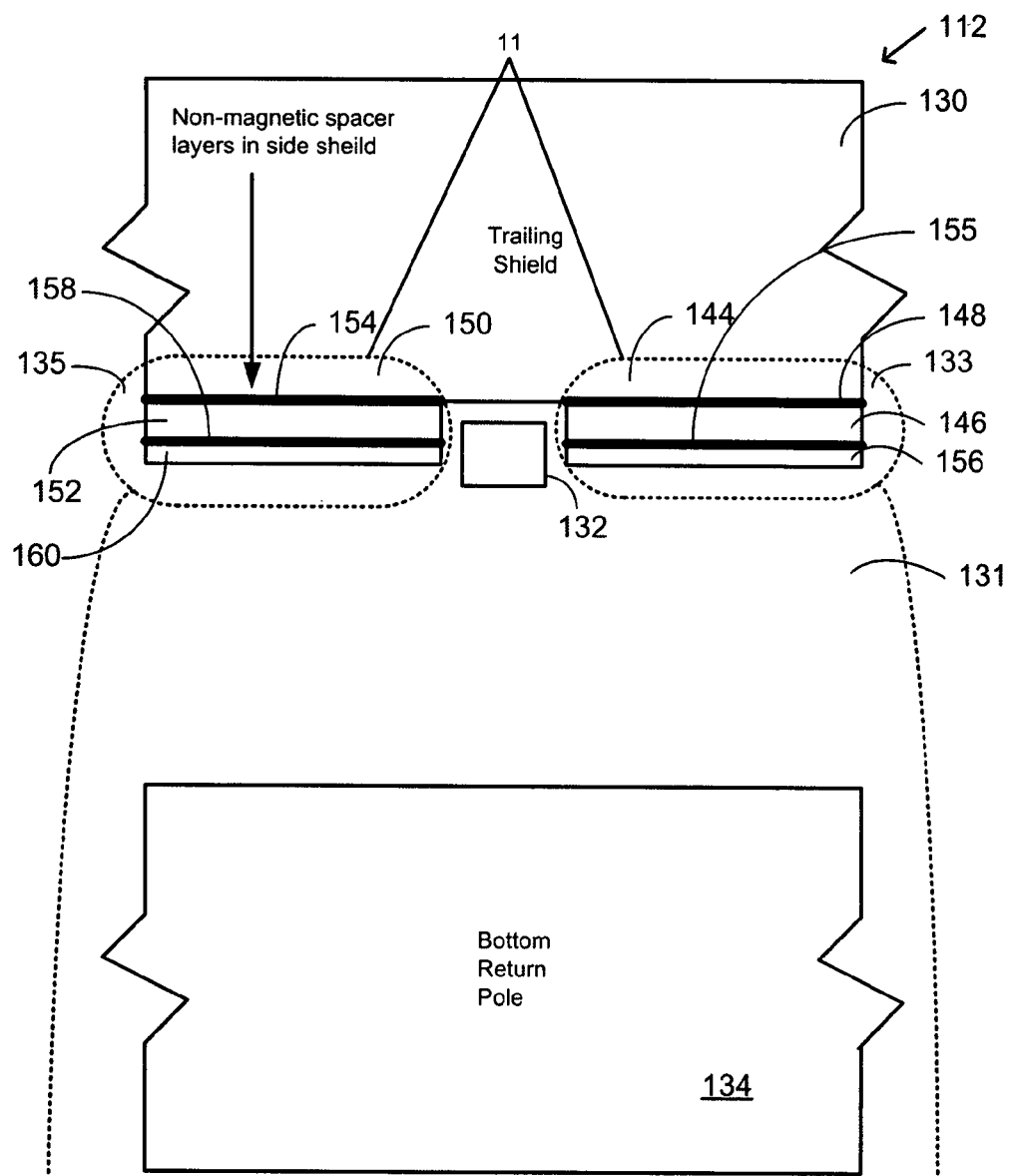
Figure 7:
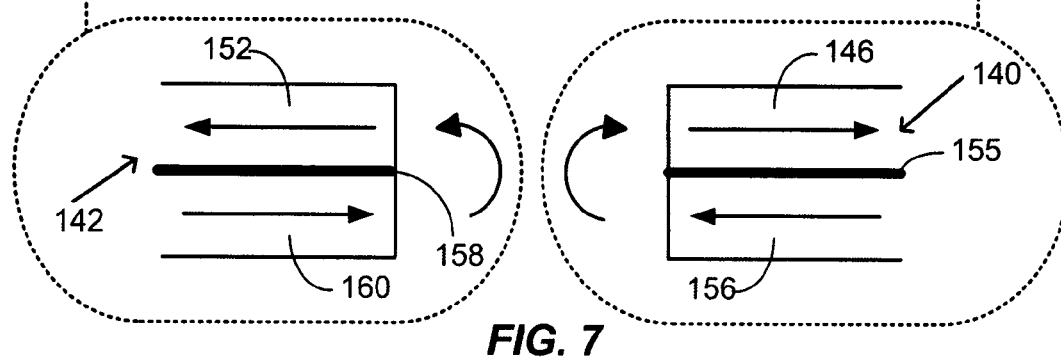

FIG. 6 shows an ABS view of a portion of the perpendicular write head (or recorder) 112 in accordance with an embodiment of the present invention FIG. 7 shows two magnetic layers 144 and 146 separated by and laminated with a non-magnetic layer 148 to form a part of the structure of the side shield 133.

Figure 8:
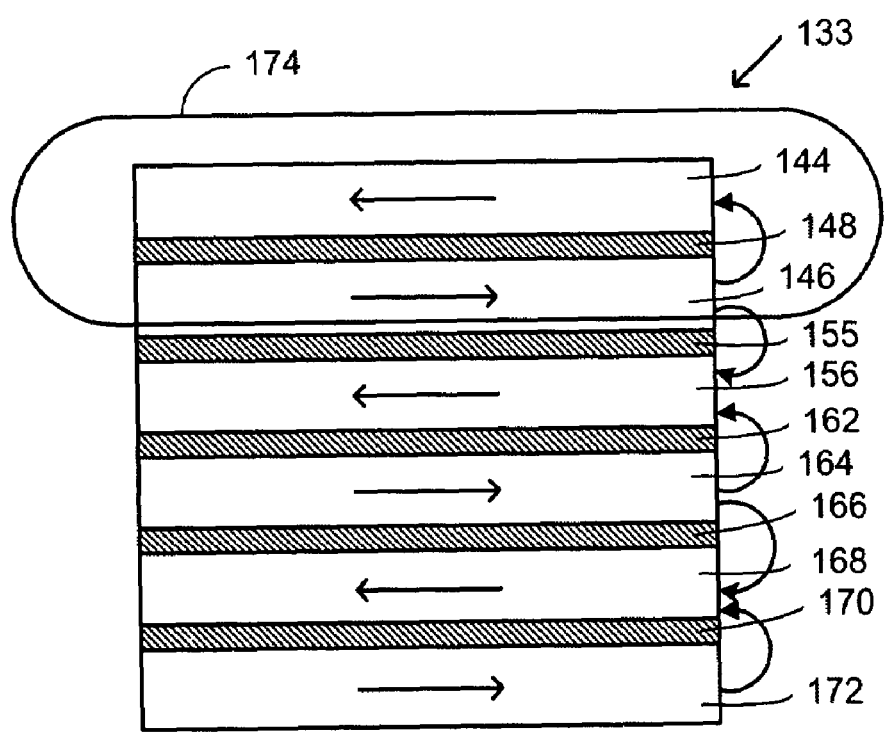

FIG. 8 shows the side shield 133 further laminated with a structure such as that of a stack 174 repeated three times.

Figure 9:
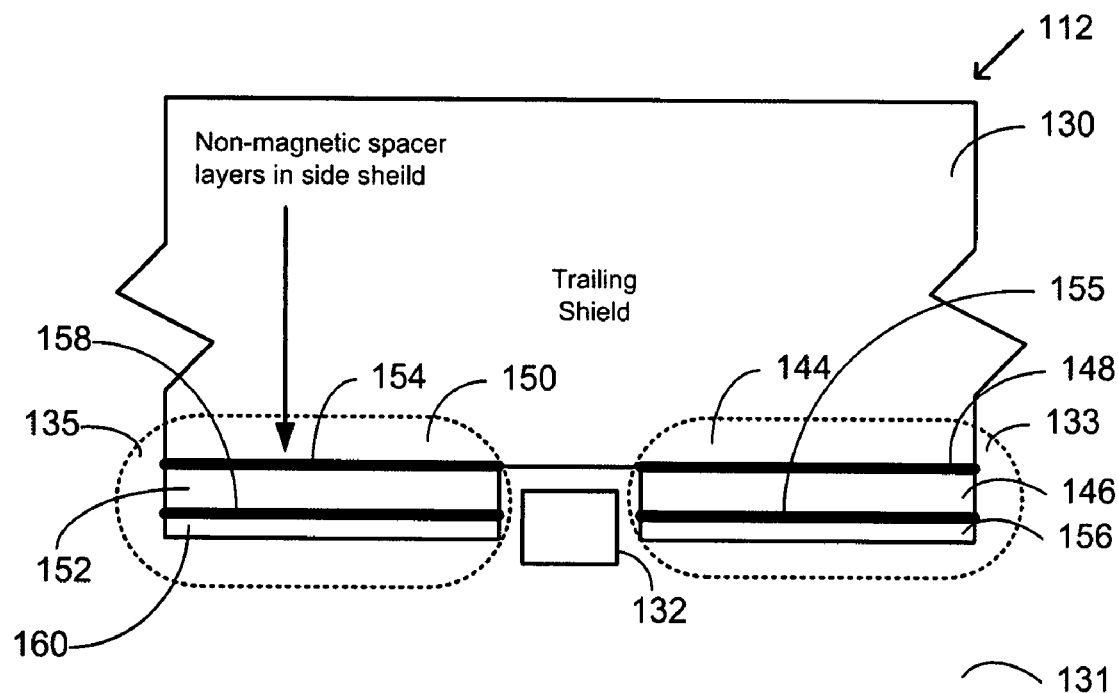
Figure 9:
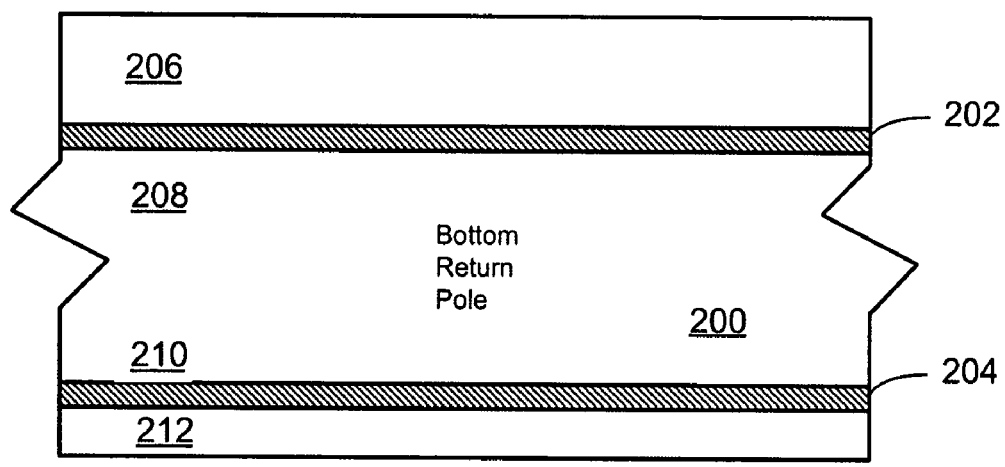
Figure 10:
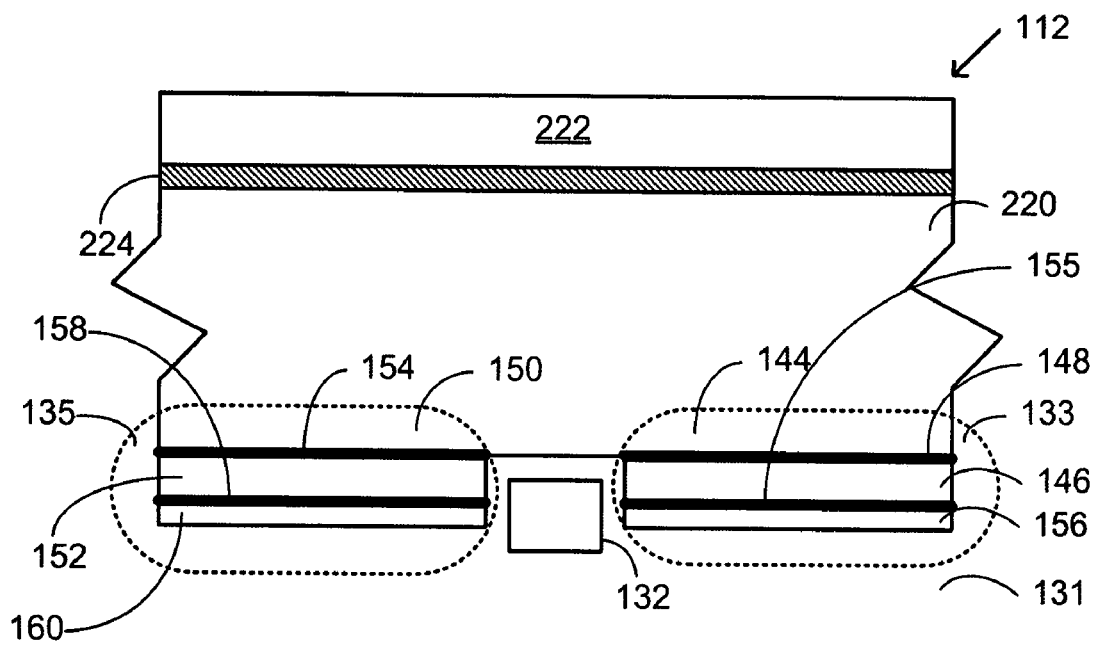
Figure 10:
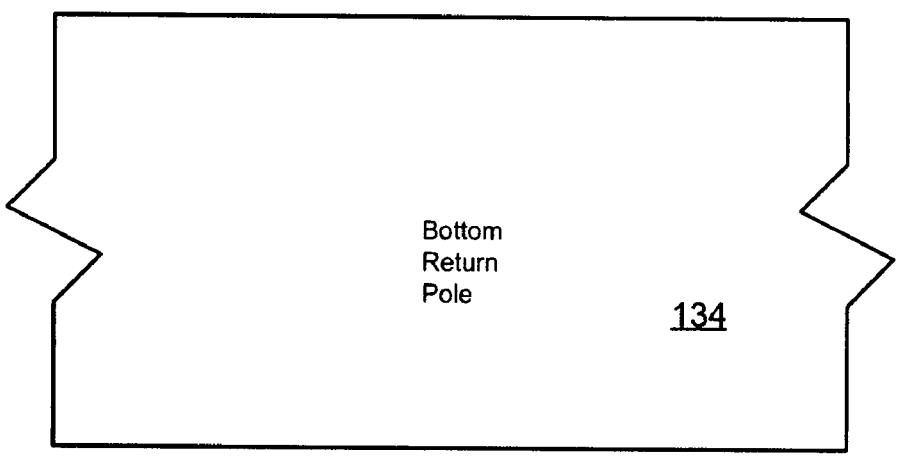
Figure 11:
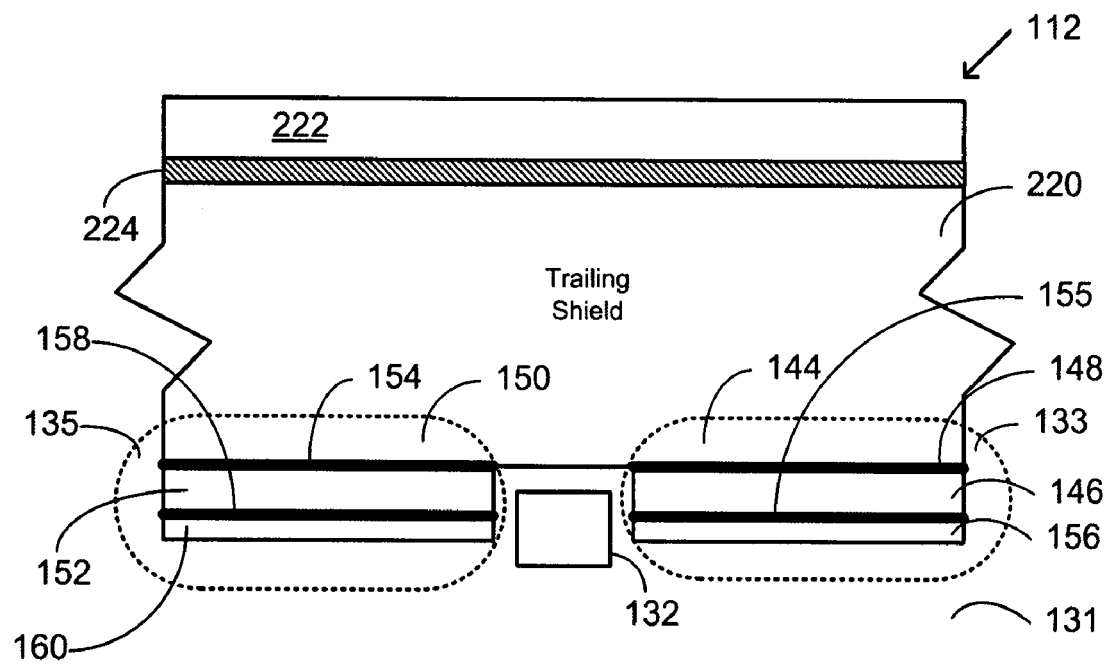
Figure 11:
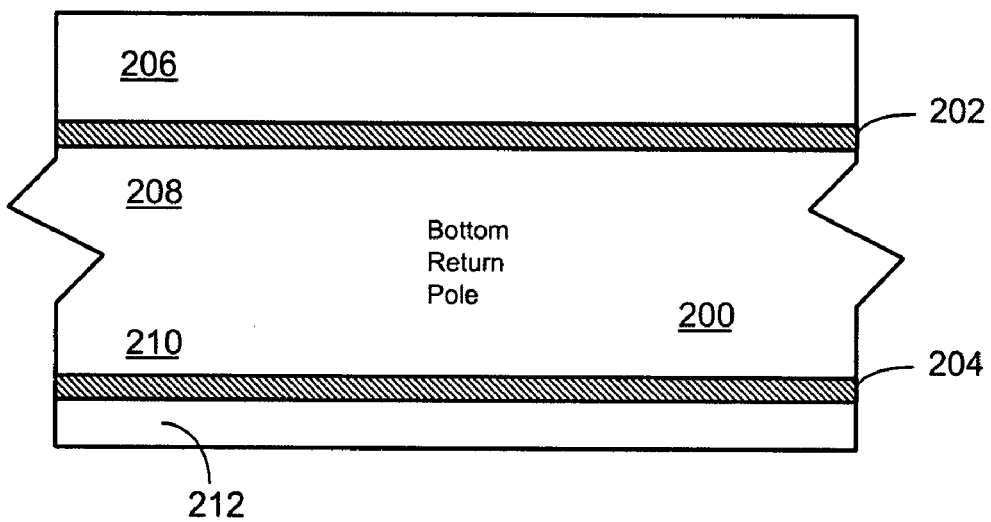

FIGS. 9-11 each show a different embodiment of the present invention.

Figure 12:
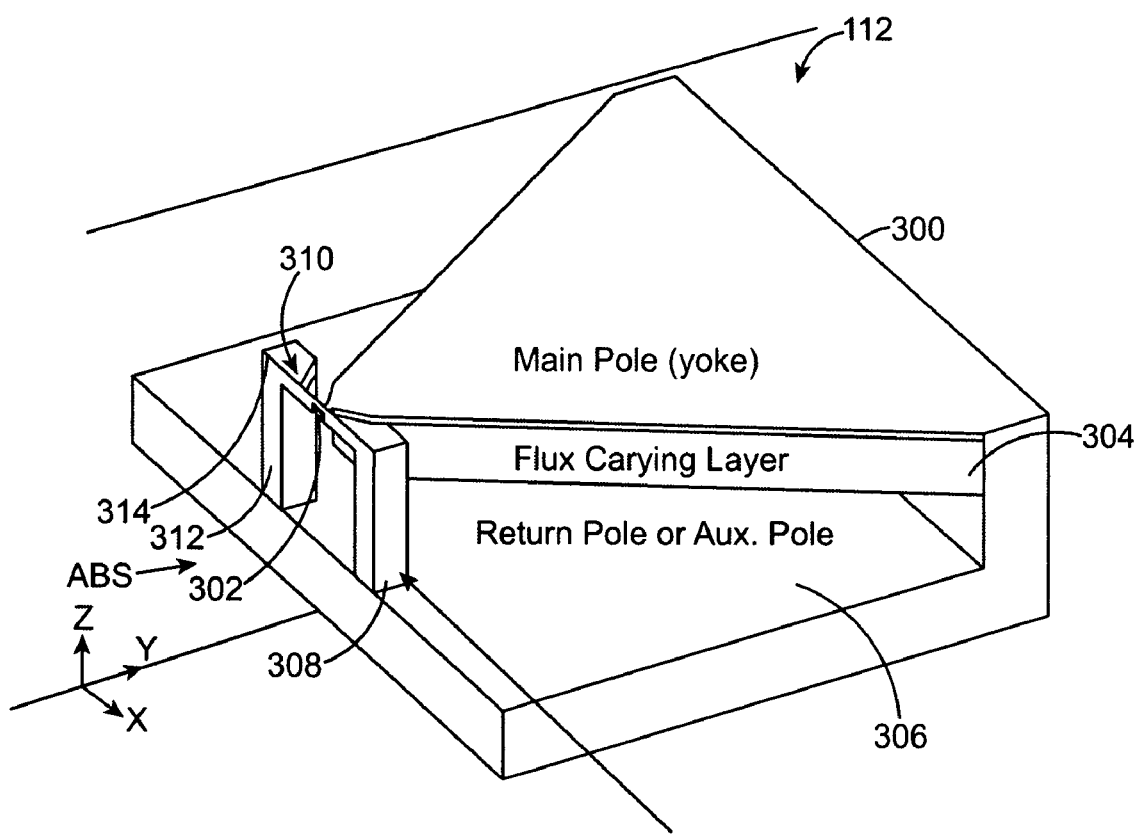

FIG. 12 shows a three dimensional ABS perspective view of the write head 112 in accordance with an embodiment of the present invention.

Figure 13:
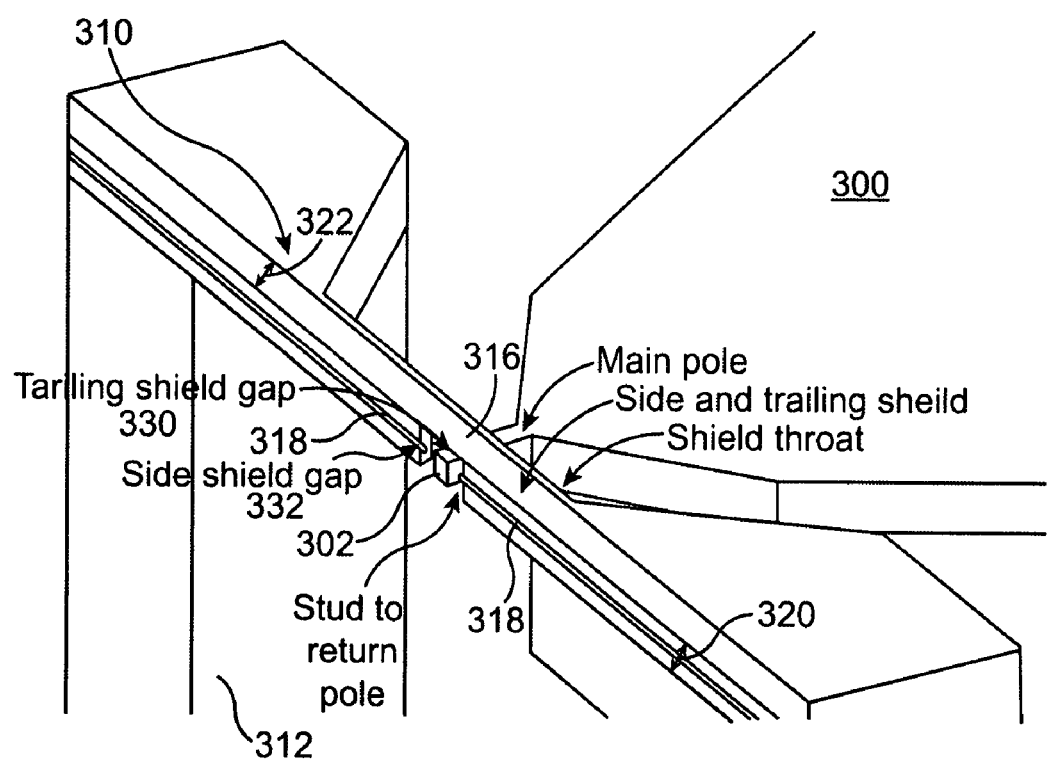

FIG. 13 shows further details of the trailing shield and side shield 310 of FIG. 12.

Figure 14:
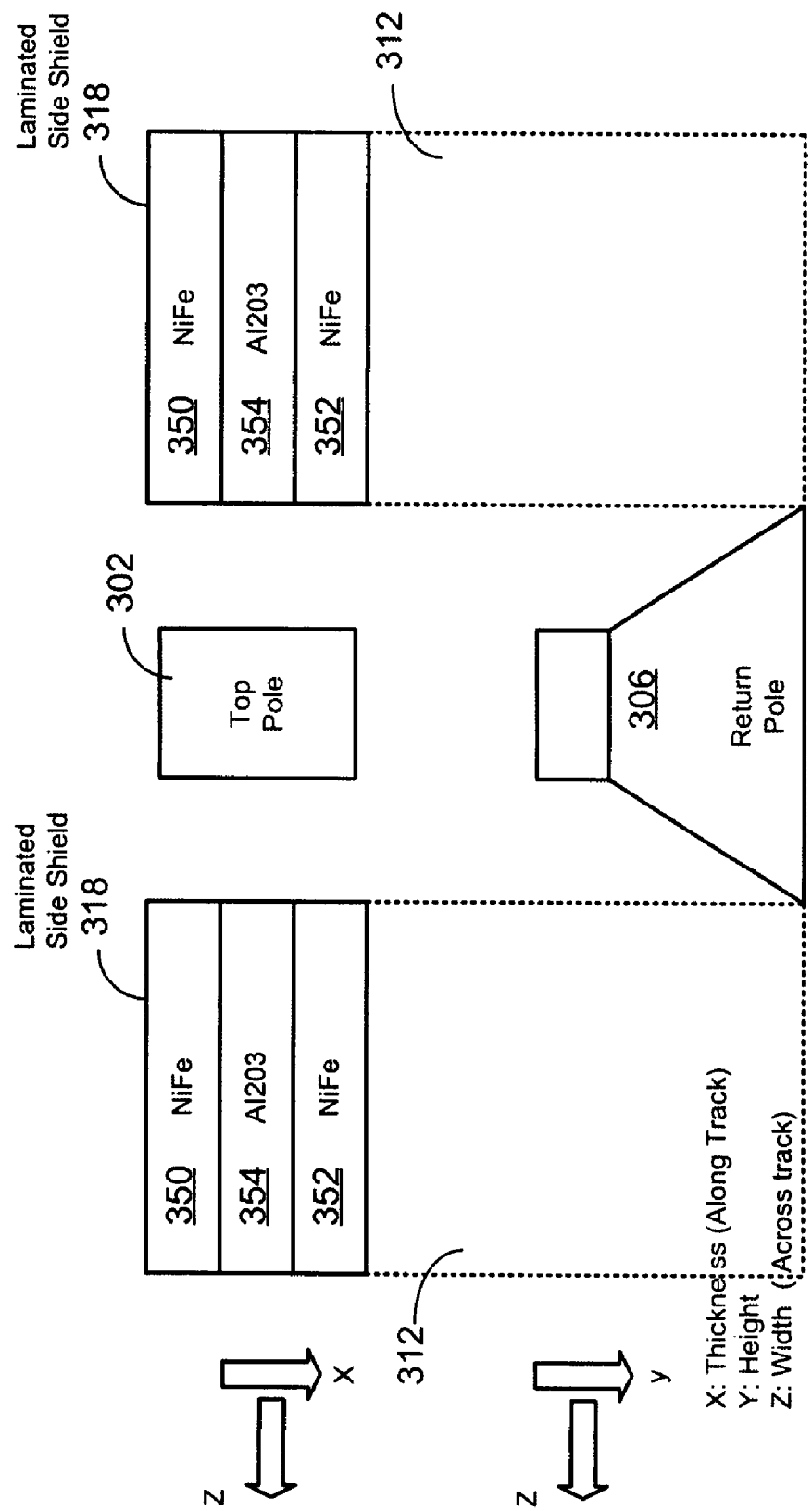

FIG. 14 shows another embodiment of the laminated side shield 318 shielding the top pole 302 in the absence of a trailing shield.

Figure 15:
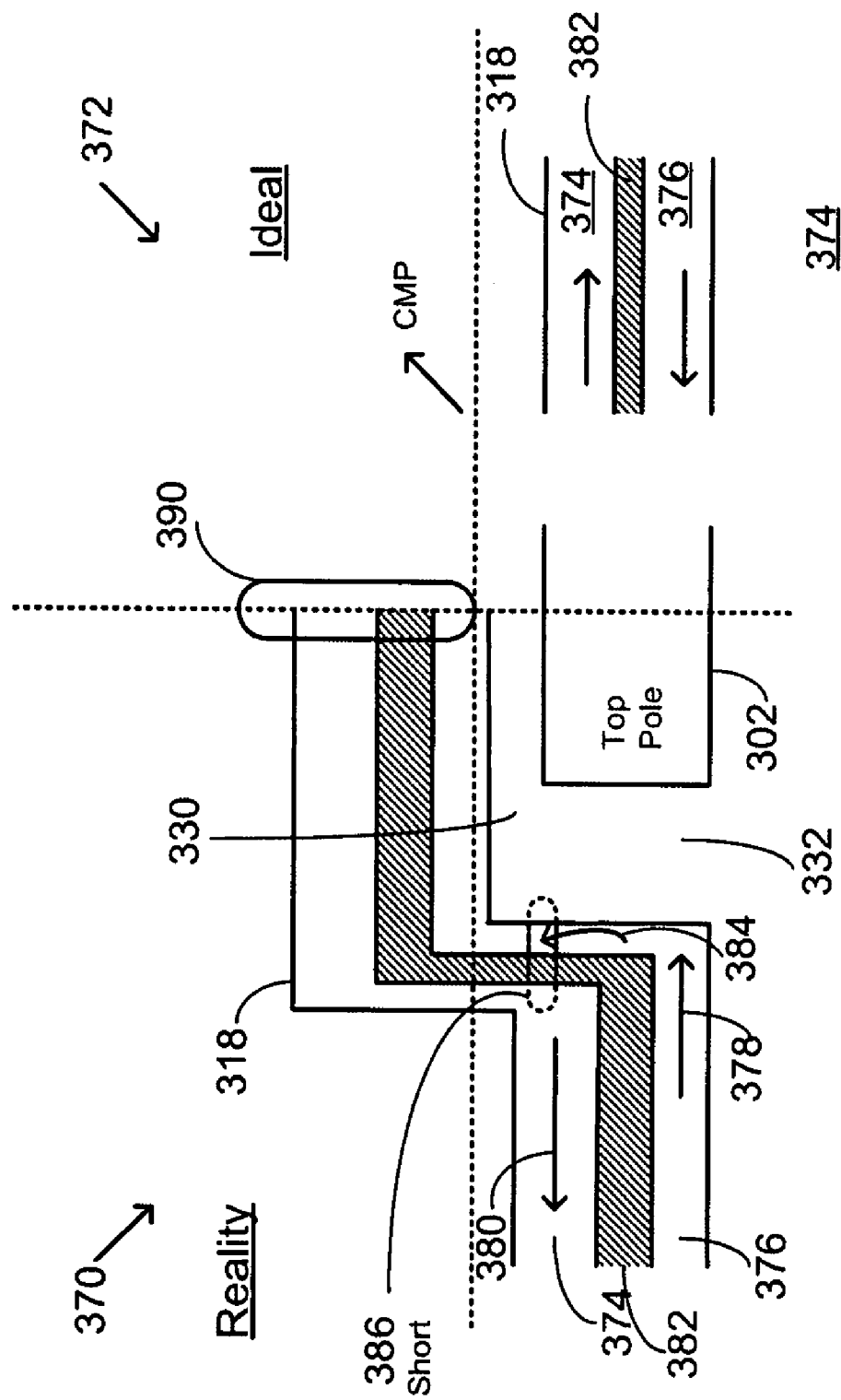

FIG. 15 shows the practical or real results, at 370, of the formation of the laminated side shield 318 during manufacturing vs. ideal results, at 372, of the formation of the laminated side shield 318 during manufacturing.

Figure 16:
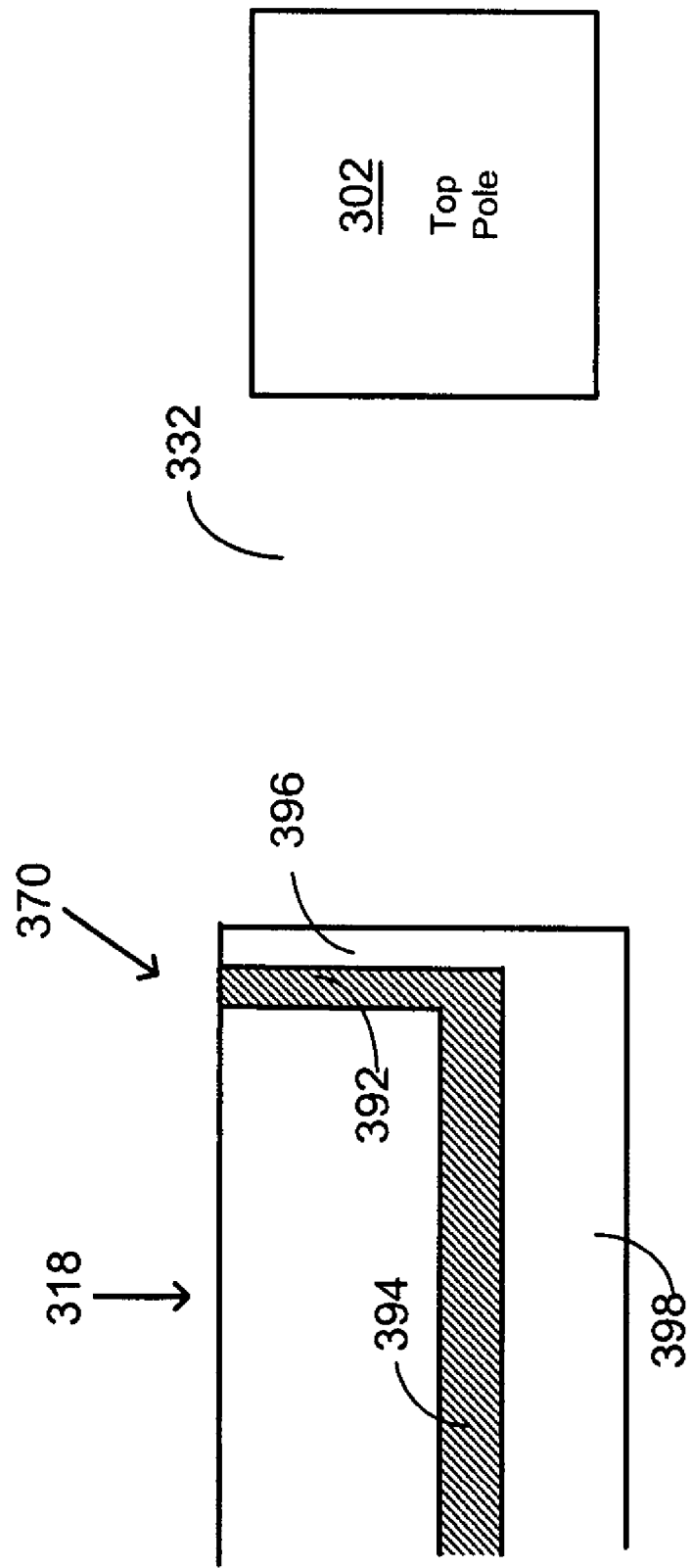

FIG. 16 shows the effects of yet one more step during manufacturing of the side shield 318.

DETAILED DESCRIPTION OF THE PREFERRED EMBODIMENT

Referring now to FIG. 5, a top perspective view of a disk drive 100 is shown in accordance with an embodiment of the present invention. The disk 100 is shown to include a voice coil motor (VCM) 102, an actuator arm 104, a suspension 106, a flexure 108, a slider 110, a write (perpendicular) head 112, a head mounting block 114, and disk or media 116. Suspension 106 is connected to the actuator arm 104 at the head mounting block 114. The actuator arm 104 is coupled to the VCM 102. The disk 116 includes a plurality of tracks 118 and rotates about axis 120. The tracks 118 are circular, each extending circularly around the surface of the disk 116 for storing magnetically-encoded data or information using the perpendicular head 112, which will be discussed in greater detail with respect to further figures. The embodiments of the present invention reduce undesirable writing or programming of adjacent tracks, as will be apparent shortly.

During operation of the disk drive 100, rotation of the disk 116 generates air movement which is encountered by the slider 110. This air movement acts to keep the slider 110 afloat a small distance above the surface of the disk 116, allowing the slider 110 to fly above the surface of the disk 116. The VCM 102 is selectively operated to move the actuator arm 104 around the axis 120, thereby moving the suspension 106 and positioning the transducing head (not shown), which includes a main pole (not shown), by the slider 110 over the tracks 118 of the disk 116. It is imperative to position the transducing head properly to read and write data from and to the concentric tracks 118.

FIG. 6 shows an ABS view of a portion of the perpendicular write head (or recorder) 112 in accordance with an embodiment of the present invention. The perpendicular recorder 112 comprises a top pole 132; side shields 11, a trailing shield 130 and a bottom return pole 134, the top pole 132 and the return pole 132 being connected to each other at a back gap closure at a distal end (not shown) and separated from each other by a gap 131 at the ABS and a write coil (not shown) positioned between the top pole 132 and the return pole.

Magnetization transitions on the disk 116 are recorded by the top pole 132. The top pole 132 has submicron width at the ABS to provide recording of ultra-narrow tracks on the disk 116. The proposed structure of the side shields 11 increases the permeability of the side shields, reducing undesirable adjacent writing effects thereby increasing performance.

To write data to the perpendicular magnetic disk (or medium) 116, a time-varying write current is caused to flow through a coil, which in turn produces a time-varying magnetic field through the top pole 132 and the return pole. The disk 116 is then passed by the ABS of the recorder 112 at a predetermined distance such that the disk 116 is exposed to the magnetic field.

The trailing shield 130 is shown to include a side shield 11. The side shield 11 has a multilayer structure in accordance with one embodiment of the present invention and is referred to as a laminated side shield. The side shield is shown to include a right laminated side shield 133 and a left laminated side shield 135. The side shields 133 and 135, along with the trailing shield 130 act to minimize the stray field from the top pole 132 from writing on adjacent data tracks. As earlier noted, the top pole 132 is a narrow (in width) extension of the main pole (not shown). Furthermore, the proposed structure of the side shield, namely lamination thereof, causes a domain structure that includes domains substantially in a direction that is parallel to the direction of flux and thereby easier to move. This is shown in FIG. 7, wherein a partial domain structure of a portion of the side shield 133 is shown at 140 and the domain structure of the side shield 135 is shown at 142, as viewed from the ABS. While the trailing shield 130 and the side shield 11 is shown to have a draped structure to drape or shield the top pole 132, other shapes of the shield 11 are anticipated. Examples of such shapes include but are not limited to U-shaped, O-shaped or any other type of shape that acts to shield the top pole 132.

FIG. 7 shows the domain structure for the botton three-layer lamination of each of the poles 133 and 135. In FIG. 7, the two magnetic layers 156 and 146 are shown separated by and laminated with the non-magnetic layer 155, as shown in FIG. 6, to form a part of the structure of the side shield 133 thereby causing the magnetization to form a closed loop of conductivity around the laminated side shield structure. This would increase the permeability of the side shields adjacent to the write pole by eliminating edge closure domains, thus reducing overwriting of adjacent tracks when the trailing edge of the write head is positioned on top of the track. Similarly and as shown in FIG. 6, the structure of a portion of the side shield 135 is shown to include the magnetic layer 152 laminated to an adjacent non-magnetic layer 158, which is, in turn, laminated to an adjacent magnetic layer 160. The layers 152 and 160 are effectively oriented anti-parallel to each other due to magnetostatic coupling across the non-magnetic interlayer, as are the layers 146 and 156.

Examples of the material used to form the magnetic layers 144, 146, 150 and 152 are nickel ferrous (or iron) NiFe, cobalt ferrous CoFe, cobalt nickel ferrous CoNiFe, CoNi or any magnetic material made from iron, nickel or cobalt alloy. The non-magnetic layers 148 and 154, which are commonly referred thereto as to spacers, may be of any dielectric material, such as aluminum oxide AlO, silicon oxide SiO, or silicon nitride SiN, or a non-magnetic alloy such as nickel chrome NiCr. These layers can each be of any suitable thickness. In one embodiment, the thickness of the non-magnetic layers 148 and 154 are each in the range of 5-100 Angstroms and more typically 10-55 Angstroms and the thickness of the magnetic layers 144, 146, 150 and 152 are each 20-500 Angstroms.

In FIG. 6, the trailing shield 130 is generally substantially larger in size than the top pole 132. In fact, in one embodiment of the present invention, the trailing shield 130 is more than 10 times that of the size of the top pole 132. Similarly, the bottom return pole is substantially larger in size than the top pole 132. A large flux density radiates out of the small top pole, hence, producing a large field for writing onto the media. The radiated flux field is dispersed and collected by a much larger return pole. This huge area means it can return more of the flux that gets dispersed, and also means there won't be large flux density at the return pole, since if there is a large flux density, there will be a large field, and hence will write the media at that place as well.

While in FIG. 7, two magnetic layers are shown separated by a non-magnetic layer, it should be understood that many stacks of such a structure may be employed. For example, in FIG. 6, the side shield 133 is shown to include the layers 156 and 146 separated by the layer 155 but further thereto is shown a non-magnetic layer 148, which is adjacent to the layer 146 and acting to separate the layer 146 from a magnetic layer 144. The side shield 135 is shown to include the layers 160 and 152 separated by the layer 158 but further thereto is shown a non-magnetic layer 154, which is adjacent to the layer 152 and acting to separate the layer 152 from a magnetic layer 150. Similarly, additional stacks of the lamination structure of the poles 133 and 135 may be employed, as shown in FIG. 8. The layers 144, 146, 150, 152, 160 and 156 are made of essentially the same magnetic material while the layers 148, 154, 155 and 158 are made of essentially similar non-magnetic material.

While the layers of the side shields 133 and 135 are illustrated as planar layers, it is contemplated that they may follow other contours. Additionally, the illustrations are not rendered to scale, as noted hereinabove.

In an alternative embodiment, the entire trailing shield 130 is laminated, such as shown with respect to the side shields 133 and 135. In yet another embodiment of the present invention, the bottom return pole 134 of FIG. 6 is laminated with a two magnetic layers separated by a non-magnetic layer, such as the structure discussed with reference to the side shields 133 and 135, in fact, such a structure may be repeated where magnetic layers separated by non-magnetic layers is repeated multiple times.

FIG. 8 shows a shield 133 further laminated with a structure such as that of a stack 174 repeated three times. That is the two magnetic layers 144 and 146 of the stack 174 are separated by a non-magnetic layer 148, and as previously discussed, causing anti-parallel alignment between the layers 144 and 146 with the magnetization forming a flux closed loop around the two magnetic layers. Such a structure is repeated three times in FIG. 8. That is, the magnetic layers 146 and 156 are separated by the non-magnetic layer 155, the magnetic layers 156 and 164 are separated by the non-magnetic layer 162, the magnetic layers 164 and 168 are separated by the non-magnetic layer 166 and the magnetic layers 168 and 172 are separated by the non-magnetic layer 170.

FIG. 9 shows an ABS view of an alternative embodiment of the write head 112 having a laminated bottom return pole 200. That is, the non-magnetic layer 202 is shown laminated between the magnetic layers 206 and 208 thereby separating the two magnetic layers and the non-magnetic layer 204 is shown laminated between the magnetic layers 210 and 212 thereby separating them. The number of non-magnetic layers separating two adjacent magnetic layers thereto can be one (forming a stack) or more, as previously discussed.

FIG. 10 shows an ABS view of another alternative embodiment of the write head 112 having a laminated trailing shield 220 together with laminated side shields 133 and 135. That is, the non-magnetic layer 224 is shown laminated between the magnetic layers 222 and 220 thereby separating the latter magnetic layers. The number of non-magnetic layers separating two adjacent magnetic layers thereto can be one (forming a stack) or more, as previously discussed.

FIG. 11 shows an ABS view of yet another embodiment of the write head 112 with both the trailing shield 220 and the side shields 133 and 135 being laminated as well as the bottom return pole 200 being laminated.

Accordingly, in one embodiment of the present invention, a write head includes laminated side shields at least in the region closest to the pole tip to allow for higher permeability and therefore higher performance write operations.

FIG. 12 shows a three dimensional ABS perspective view of the write head 112 in accordance with an embodiment of the present invention. While not shown, a disk that is being programmed by the write head 112 spins around the y-axis. The write head 112 is shown to include a main pole (or yoke) 300 and at the narrow end of the main pole 300 is shown the top pole 302. The write head 112 is further shown to include a flux carrying layer 304 adjacently below the main pole 300 and the main pole 300 at its wider portion drops down to meet a return pole 306 (or auxiliary pole). The top pole is surrounded by a gap or spacer and shielded by a trailing shield and side shields 310. A pair of studs 312 is shown to connect the trailing shield and side shields 310 to the return pole 306 along the z-axis. The side shield is shown to be laminated at 314.

FIG. 13 shows further details of the trailing shield and side shield 310 of FIG. 12. In FIG. 13, the top pole 302 is shown to be surrounded by a trailing shield gap 330 and a side shield gap 332, which are in contact with the trailing shield 316 and the side shield 318, respectively. That is, the top pole 302 is shielded by the trailing shield 316 and the side shield 318 while being separated therefrom via the trailing shield gap 330 and the side shield gap 332. One of the pairs of studs 312 is shown to connect the trailing shield 316 to the return pole.

Lamination of the side shield 318 is shown at 320, an area located on either side of the top pole 302 and extending from one of the pairs of the studs 312 to the other. The area 322, which is a part of the trailing shield 316 is not laminated in the embodiment of FIG. 13. However, as previously shown with respect to other figures herein, in another embodiment of the present invention, the area 322 is also laminated.

When manufacturing the write head 112 of FIG. 13, first, the top pole 302 is formed followed by the formation of the side shield 318 followed by the trailing shield 316. If lamination of the trailing shield 316 or side shields 318 is desired, such lamination is performed during the formation of those layers. If studs are desirable, the pair of studs 112 are formed.

In yet another embodiment of the present invention, shown in FIG. 14, the laminated side shield 318 shields the top pole 302 in the absence of a trailing shield. In FIG. 14, the laminated side shield 318 is shown to be formed of two magnetic layers 350 and 352 separated by a non-magnetic lamination layer 354. In one example, the layers 350 and 352 are formed substantially of the material NiFe and the layer 354 is formed substantially of the material $Al_2O_3$. Alternatively and as discussed earlier, the side shield 318 can be formed of a plurality of stacks of the two magnetic layer and one non-magnetic layer structure.

In yet another embodiment of the present invention, the side shield 318 is connected to the return pole 306 through the pair of studs 312.

FIG. 15 shows the practical or real results, at 370, of the formation of the laminated side shield 318 during manufacturing vs. ideal results, at 372, of the formation of the laminated side shield 318 during manufacturing. The top pole 302 is shown to be surrounded by the trailing shield gap 330 and the side shield gap 332. The magnetic layers 374 and 376 are shown to have moments 380 and 378, respectively, in the directions shown. A non-magnetic layer 382 is shown laminated between the layers 374 and 376 and such laminated structure is shown to cause the moment 384 thereby forming a closed flux loop with the moments 378 and 380. However, during manufacturing, formation of the layers 374, 376 and 382, practically, causes these layers to extend across the top portion of the top pole 302 and form continuously on either side thereof where the side shields 318 are formed. In an ideal structure, such as shown at 372, the magnetic layers 374 and 376 and the non-magnetic layer 382 are shown to truly only extend on the side of the top pole 302 without forming across the top of the top pole 302, such as shown at 370.

FIG. 16 shows the effects of yet one more step during manufacturing of the side shield 318, which is after chemical mechanical polishing (CMP) is performed on the side shield 318 at 370, effectively removing the top portion, formed on top of the top pole 302, of the lamination structure of the side shield 318. It should be noted that the vertical portion of the non-magnetic layer 382, shown at 392, is substantially smaller in thickness than the horizontal portion of the non-magnetic layer 382, shown at 394. In one embodiment of the present invention, at 392, the layer 382 is one-fourth the thickness of the layer 382 at 394. Similarly, the thickness of the magnetic layers at 396 are substantially smaller in thickness than at 398 and in one embodiment, the size difference is one-fourth, such as for the non-magnetic layer. This structure essentially causes a magnetic short at 386 in FIG. 15. The formation of the side shield 318 as shown at 370 in FIG. 15 and in FIG. 16 is sometimes referred to as edge-closed lamination.

It should be understood that lamination, as discussed herein, is presumed to have a total layer thickness approximately the same height of the original side shield. For example, in FIG. 14, the laminate thickness, measured by the thickness of the layers 350-354 is approximately the same as the height of the side shield 318.

Although the present invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A perpendicular write head for writing information onto tracks of a magnetic medium comprising:
   a top pole; and
   side shields shielding the top pole and each having laminated layers wherein said laminated layers have magnetization in a direction parallel to an air bearing surface (ABS) and perpendicular to the tracks.

2. A perpendicular write head as recited in claim 1 wherein the laminated layers include a non-magnetic layer laminated and positioned adjacent to two magnetic layers forming a stack.

3. A perpendicular write head as recited in claim 2 wherein the laminated layers include a plurality of stacks.

4. A perpendicular write head as recited in claim 2 wherein the magnetic layers are of a material having high magnetic moment.

5. A perpendicular write head as recited in claim 4 wherein the magnetic layers are each composed of an alloy of at least one of the elements iron, nickel or cobalt.

6. A perpendicular write head as recited in claim 4 wherein the magnetic layers are composed of a group comprising of: Nickel Ferrous (or iron) NiFe, Cobalt Ferrous CoFe, Cobalt Nickel Ferrous CoNiFe and CoNi.

7. A perpendicular write head as recited in claim 2 wherein the non-magnetic layer is composed of a group comprising of: Nickel Chromium NiCr, Aluminum Oxide AlO, Silicon Oxide SiO, or SiN.

8. A perpendicular write head as recited in claim 2 wherein said first and second magnetic layers have anti-parallel orientation magnetization with respect to one another due to magnetostatic coupling of the first and second magnetic layers.

9. A perpendicular write head as recited in claim 1 wherein said top pole is laminated.

10. A perpendicular write head as recited in claim 1 further including a trailing shield and a bottom return pole.

11. A perpendicular write head as recited in claim 10 wherein the bottom return pole is laminated.

12. A perpendicular write head as recited in claim 1 wherein the side shields form a U-shape.

13. A perpendicular write head as recited in claim 1 wherein the side shields form an 0-shape.

14. A perpendicular write head as recited in claim 1 further including at least one stud connecting the side shields to a return pole.

15. A perpendicular write head as recited in claim 1 wherein the side shields are draped.

16. A write head for writing information onto tracks of a magnetic medium comprising:
    a top pole; and
    side shields shielding the top pole and having laminated layers wherein said laminated layers have magnetization in a direction parallel to an air bearing surface (ABS) and perpendicular to the tracks.

17. A write head as recited in claim 16 wherein the laminated layers include a non-magnetic layer laminated and positioned adjacent to two magnetic layers forming a stack.

18. A write head as recited in claim 17 wherein the laminated layers include a plurality of stacks.

19. A write head as recited in claim 17 wherein the magnetic layers are of a material having high magnetic moment.

20. A write head as recited in claim 19 wherein the magnetic layers are each composed of an alloy of at least one of the elements iron, nickel or cobalt.

21. A write head as recited in claim 19 wherein the magnetic layers are composed of a group consisting of: Nickel Ferrous (or iron) NiFe, Cobalt Ferrous CoFe, Cobalt Nickel Ferrous CoNiFe and CoNi.

22. A write head as recited in claim 17 wherein the non-magnetic layer is composed of a group consisting of: Nickel Chromium NiCr, Aluminum Oxide AlO, Silicon Oxide SiO, or SiN.

23. A write head as recited in claim 17 wherein said two magnetic layers are oriented anti-parallel to each other due to magnetostatic coupling of the two magnetic layers.

24. A write head as recited in claim 16 wherein said top pole is laminated.

25. A write head as recited in claim 16 further including a trailing shield and a bottom return pole.

26. A perpendicular write head as recited in claim 25 wherein the bottom return pole is laminated.

27. A perpendicular write head as recited in claim 16 wherein the side shields form a U-shape.

28. A perpendicular write head as recited in claim 16 wherein the side shields form a O-shape.

29. A perpendicular write head as recited in claim 16 wherein the side shields are draped.

30. A perpendicular write head as recited in claim 16 further including one or more studs connecting the side shields to a return pole.

31. A perpendicular write head comprising:
a top pole; and
side shield means shielding the top pole and having laminated layers wherein said laminated layers have magnetization in a direction parallel to an air bearing surface (ABS) and perpendicular to the tracks.

32. A perpendicular write head as recited in claim 31 wherein the laminated layers include a non-magnetic layer laminated and positioned adjacent two magnetic layers forming a stack.

33. A perpendicular write head as recited in claim 32 wherein the magnetic layers are of a material having high magnetic moment.

34. A perpendicular write head as recited in claim 33 wherein the magnetic layers are each composed of an alloy of at least one of the elements iron, nickel or cobalt.

35. A perpendicular write head as recited in claim 33 wherein the magnetic layers are composed of a group consisting of: Nickel Ferrous (or iron) NiFe, Cobalt Ferrous CoFe, Cobalt Nickel Ferrous CoNiFe and CoNi.

36. A perpendicular write head as recited in claim 32 wherein the non-magnetic layer is composed of a group consisting of: Nickel Chromium NiCr, Aluminum Oxide AlO, Silicon Oxide SiO, or SiN.

37. A perpendicular write head as recited in claim 32 wherein said two magnetic layers are oriented anti-parallel to each other due to magnetostatic coupling thereof.

38. A perpendicular write head as recited in claim 31 wherein the laminated layers include a plurality of stacks.

39. A perpendicular write head as recited in claim 31 wherein said top pole is laminated.

40. A perpendicular write head as recited in claim 31 further including a trailing shield and a bottom return pole.

41. A perpendicular write head as recited in claim 40 wherein the bottom return pole is laminated.

42. A perpendicular write head as recited in claim 31 wherein the side shields form a U-shape.

43. A perpendicular write head as recited in claim 31 wherein the side shields form an O-shape.

44. A perpendicular write head as recited in claim 31 wherein the side shields are draped.

45. A disk drive for storing information onto tracks on magnetic medium comprising:
a motor; and
at least one write head mounted on an actuator arm and coupled therethrough to the motor, said write head having a top pole and at least one draped side return shield having laminated layers wherein said laminated layers have magnetization in a direction parallel to an air bearing surface (ABS) and perpendicular to the tracks.

46. A disk drive as recited in claim 45 wherein the laminated layers include a non-magnetic layer laminated and positioned adjacent to two magnetic layers forming a stack.

47. A disk drive as recited in claim 46 wherein the laminated layers include a plurality of stacks.

48. A perpendicular write head as recited in claim 46 wherein the magnetic layers are of a material having high magnetic moment.

49. A perpendicular write head as recited in claim 48 wherein the magnetic layers are each composed of an alloy of at least one of the elements iron, nickel or cobalt.

50. A perpendicular write head as recited in claim 48 wherein the magnetic layers are composed of a group consisting of: Nickel Ferrous (or iron) NiFe, Cobalt Ferrous CoFe, Cobalt Nickel Ferrous CoNiFe and CoNi.

51. A perpendicular write head as recited in claim 46 wherein the non-magnetic layer is composed of a group consisting of: Nickel Chromium NiCr, Aluminum Oxide AlO, Silicon Oxide SiO, or SiN.

52. A perpendicular write head as recited in claim 46 wherein said two magnetic layers are oriented anti-parallel to each other due to magnetostatic coupling thereof.

53. A perpendicular write head as recited in claim 45 wherein said top pole is laminated.

54. A perpendicular write head as recited in claim 45 further including a trailing shield and a bottom return pole.

55. A perpendicular write head as recited in claim 54 wherein the bottom return pole is laminated.

56. A perpendicular write head as recited in claim 45 wherein the side shields form a U-shape.

57. A perpendicular write head as recited in claim 45 wherein the side shields form an 0-shape.

58. A perpendicular write head as recited in claim 45 wherein the side hields are draped.

59. A perpendicular write head as recited in claim 45 further including at least one stud connecting the side shields to a return pole.

* * * * *